(12) United States Patent
Yamamoto et al.

(10) Patent No.: US 7,524,000 B2
(45) Date of Patent: Apr. 28, 2009

(54) BRAKE STATUS INDICATOR CONTROL FOR AN ELECTRIC BRAKE SYSTEM OF A VEHICLE

(75) Inventors: David T. Yamamoto, Mill Creek, WA (US); Neil T. Rapues, Lake Stevens, WA (US); Tanong Nalamliang, Stanwood, WA (US)

(73) Assignee: The Boeing Company, Chicago, IL (US)

( * ) Notice: Subject to any disclaimer, the term of this patent is extended or adjusted under 35 U.S.C. 154(b) by 317 days.

(21) Appl. No.: 11/566,585

(22) Filed: Dec. 4, 2006

(65) Prior Publication Data
US 2008/0133072 A1 Jun. 5, 2008

(51) Int. Cl.
*B60T 8/86* (2006.01)
(52) U.S. Cl. ....................... 303/126; 303/199
(58) Field of Classification Search ................. 303/126, 303/3, 125, 20, 89, 199, 9.61, 9.62; 244/111
See application file for complete search history.

(56) References Cited

U.S. PATENT DOCUMENTS

| | | | |
|---|---|---|---|
| 5,417,477 A | 5/1995 | Lasbleis | |
| 6,095,293 A | 8/2000 | Brundett et al. | |
| 6,406,102 B1 | 6/2002 | Arnold | |
| 6,604,030 B1 | 8/2003 | Davis et al. | |
| 2002/0017439 A1 | 2/2002 | Hill et al. | |
| 2007/0016353 A1* | 1/2007 | Bredin | ........................ 701/70 |

FOREIGN PATENT DOCUMENTS

CN 1492160 A 8/2002

* cited by examiner

*Primary Examiner*—Melanie Torres
(74) *Attorney, Agent, or Firm*—Tung & Associates (57) ABSTRACT

A system and procedures for controlling a brake status indicator for an aircraft having an electric brake system are disclosed. Electric activation and deactivation of the brake status indicator mimics that of legacy hydraulic brake systems. The control methodology obtains brake force data that indicates actual clamping force of the electric brake actuators, parking brake lever status data that indicates whether the parking brake lever is raised or lowered, and parking brake activation data that indicates whether the parking brake mechanisms are active or inactive. The individual indicator elements of the brake status indicator are independently and concurrently controlled using multiple processing modules/channels of the electric brake system.

20 Claims, 5 Drawing Sheets

FIG. 1

| | 208 ↓ Parking Brake Lever | 210 ↓ Friction Brake (All) | 212 ↓ Brake Force Application | 202 ↓ Brake On | 204 ↓ Parking Brake Set | 206 ↓ Brake Off | Configuration Validity |
|---|---|---|---|---|---|---|---|
| | SET | SET | | ○ | ● | ● | FAULT |
| 213 → | SET | SET | | ● | ● | ○ | OK |
| | SET | SET | | ○ | ● | ○ | FAULT |
| PARKING | SET | SET | | ○ | ● | ○ | FAULT |
| 216 → | SET | NOT SET | | ○ | ○ | ● | FAULT |
| | SET | NOT SET | | ● | ○ | ○ | FAULT |
| | SET | NOT SET | | ○ | ○ | ○ | FAULT |
| | SET | NOT SET | | ○ | ○ | ○ | FAULT |

*FIG. 2*

| | PARKING BRAKE LEVER 208 | FRICTION BRAKE (ALL) 210 | BRAKE FORCE APPLICATION 212 | BRAKE ON 202 | PARKING BRAKE SET 204 | BRAKE OFF 206 | CONFIGURATION VALIDITY |
|---|---|---|---|---|---|---|---|
| 218 | RELEASE | SET | ○┰○ ○┰○ ○┸○ ○┸○ | ○ | ○ | ● | FAULT |
| | RELEASE | SET | ●┳● ●┳● ●┻● ●┻● | ● | ○ | ○ | FAULT |
| | RELEASE | SET | ○┳● ●┳● ●┻● ●┻● | ○ | ○ | ○ | FAULT |
| TOWING | RELEASE | SET | ●┳○ ○┳○ ○┻○ ○┻○ | ○ | ○ | ○ | FAULT |
| 214 | RELEASE | NOT SET | ○┰○ ○┰○ ○┸○ ○┸○ | ○ | ○ | ● | OK |
| | RELEASE | NOT SET | ●┳● ●┳● ●┻● ●┻● | ● | ○ | ○ | FAULT |
| | RELEASE | NOT SET | ○┳● ●┳● ●┻● ●┻● | ○ | ○ | ○ | FAULT |
| | RELEASE | NOT SET | ●┳○ ○┳○ ○┻○ ○┻○ | ○ | ○ | ○ | FAULT |

BRAKE STATUS INDICATOR CONTROL FOR AN ELECTRIC BRAKE SYSTEM OF A VEHICLE

TECHNICAL FIELD

The embodiments described herein relate generally to vehicle braking systems, such as aircraft braking systems. More particularly, the embodiments described herein relate to techniques and technologies for controlling the status of a brake status indicator of an electric brake system.

BACKGROUND

Most older aircraft brake systems utilize direct cable or hydraulic brake actuation architectures. Such cable and hydraulic control systems may suffer from weight, performance, or reliability issues. Many of these issues have been improved upon by using electrically actuated and controlled aircraft brake systems. Electrically actuated and controlled brake systems are colloquially referred to as "brake by wire" systems. Like their hydraulic counterparts, electric brake systems for aircraft may include a parking brake feature that can be activated to prevent aircraft from rolling when parked. A parking brake mechanism in an aircraft electric brake system may be electrically controlled and commanded in a manner that is integrated with the primary command/control logic of the electric brake system.

Older aircraft may utilize a brake status indicator light system that is mounted on or near the nose gear of the aircraft; this brake status indicator light system is intended to provide a simple indication of the current aircraft brake status to members of the ground crew. Typically, the brake status indicator light system will let the ground crew know whether the parking brakes of the aircraft are set and/or whether the aircraft is ready for towing (i.e., the parking brakes and wheel brakes are released and the wheels are free to rotate). An electric brake system may also cooperate with an equivalent brake status indicator light system. Accordingly, it is desirable to control the brake status indicator light system in an electric brake system in a manner that is easy for ground crew members to learn and is intuitive in view of the familiar protocols used in connection with traditional hydraulic brake systems.

Brake status indicator light systems for legacy hydraulic-based aircraft brake systems rely on data that merely infers the current brake status. For example, such legacy systems may process brake pedal deflection data, with the assumption that a deflected brake pedal will result in brake actuation. In addition, such legacy systems may process hydraulic pressure sensor data that is obtained "upstream" from the hydraulic brake actuators. Unfortunately, this upstream hydraulic pressure data may not always accurately reflect the true hydraulic pressure realized at the brake actuators.

Accordingly, it is desirable to have a reliable brake status indicator light system suitable for use with an electric brake system of an aircraft. In addition, it is desirable to drive such a brake status indicator light system using data that more accurately and reliably represents the actual brake actuation status. Furthermore, other desirable features and characteristics will become apparent from the subsequent detailed description and the appended claims, taken in conjunction with the accompanying drawings and the foregoing technical field and background.

BRIEF SUMMARY

The techniques and technologies described herein relate to the control of a brake status indicator system for an electric brake system of a vehicle such as an aircraft. The brake status indicator system is suitably configured for compatibility with the electric brake system in lieu of a legacy hydro-mechanical brake system. Moreover, the brake status indicator system relies on data that more accurately reflects the true status of the electric brake actuators.

The above and other aspects may be carried out in one embodiment by a method of controlling a brake status indicator for a vehicle having a plurality of independently controlled electric brake processing channels configured to control a plurality of electric brake actuators and a plurality of parking brake mechanisms. The method involves: obtaining brake force data for each of the plurality of processing channels, the brake force data indicating actual force imparted by the plurality of electric brake actuators; obtaining parking brake lever status data for each of the plurality of processing channels, the parking brake lever status data indicating position of a parking brake lever of the vehicle; obtaining parking brake activation data for each of the plurality of processing channels, the parking brake activation data indicating whether the parking brake mechanisms are active or inactive; and generating, in response to the brake force data, the parking brake lever status data, and the parking brake activation data, at least one control signal for the brake status indicator.

The above and other aspects may be carried out in one embodiment by a brake status indicator system for a vehicle having an electric brake system. The brake status indicator system includes: a brake status indicator having a Brake On element, a Parking Brake Set element, and a Brake Off element; and a plurality of electric brake processing modules coupled to the brake status indicator, each of the electric brake processing modules being configured to independently process electric brake system data to determine parking brake status and brake force status. The brake status indicator receives control signals generated in response to the parking brake status and the brake force status for each of the electric brake processing modules.

The above and other aspects may be carried out in one embodiment by a method of controlling a brake status indicator for a vehicle having a first brake system control unit (BSCU) and a second BSCU, the first and second BSCUs being configured to independently control respective electric brake actuators and respective parking brake mechanisms. The method involves: activating a Brake On element of the brake status indicator only if: (1) the first BSCU determines that all of the electric brake actuators associated with the first BSCU are actuated, and (2) the second BSCU determines that all of the electric brake actuators associated with the second BSCU are actuated; activating a Parking Brake Set element of the brake status indicator only if: (1) the first BSCU determines that all of the parking brake mechanisms associated with the first BSCU are activated, and (2) the second BSCU determines that all of the parking brake mechanisms associated with the second BSCU are activated; and activating a Brake Off element of the brake status indicator only if: (1) the first BSCU determines that all of the electric brake actuators associated with the first BSCU are released, and (2) the second BSCU determines that all of the electric brake actuators associated with the second BSCU are released.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the invention or the application and uses of such embodiments. Furthermore, there is no intention to be bound by any expressed or implied theory presented in the preceding technical field, background, brief summary or the following detailed description.

Embodiments of the invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with any number of data transmission protocols and that the system described herein is merely one example embodiment of the invention.

For the sake of brevity, conventional techniques and components related to signal processing, aircraft brake systems, brake system controls, digital logic architectures, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

Figure 4:
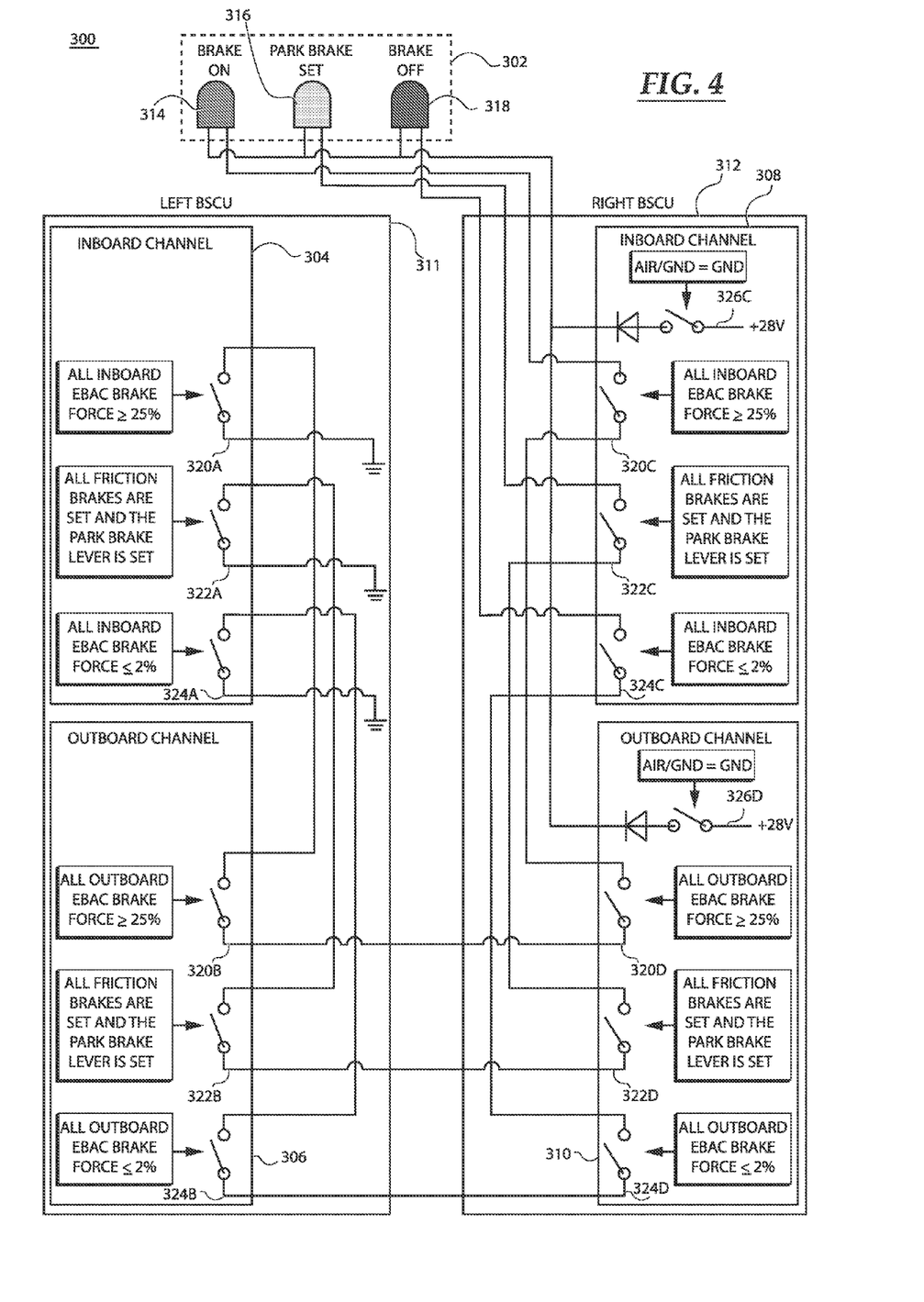
FIG. 4 is a schematic representation of an embodiment of a brake status indicator system, including related processing modules of an electric brake system.

The following description may refer to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the schematics shown in FIG. 1 and FIG. 4 depict certain arrangements of elements, additional intervening elements, devices, features, or components may be present in an embodiment of the system.

Figure 1:
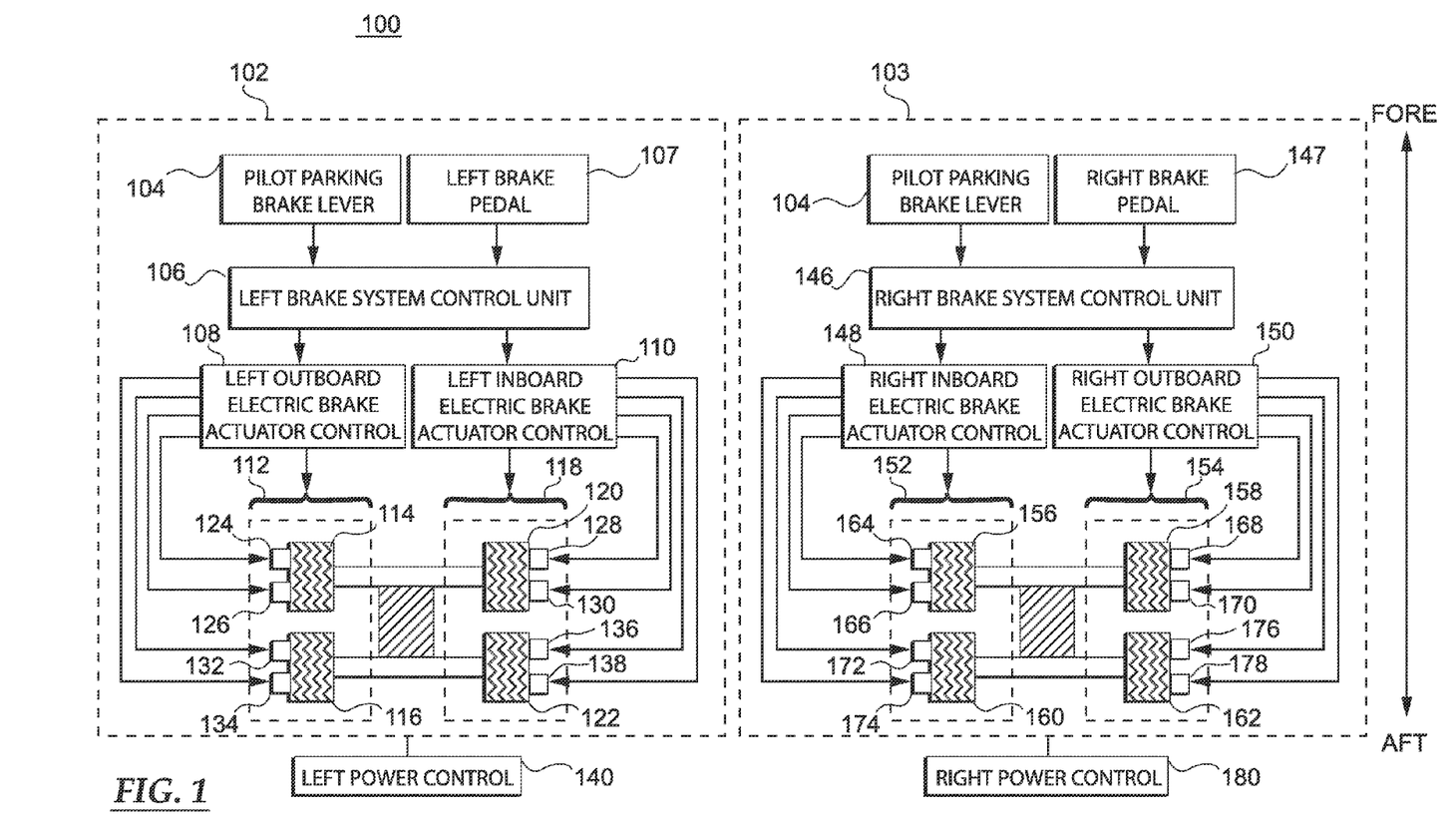
FIG. 1 is a schematic representation of an embodiment of an electric brake system.

FIG. 1 is a schematic representation of an example embodiment of an electric brake system 100 for a vehicle such as an aircraft. In the example embodiment shown in FIG. 1, the aircraft employs a left side electric brake subsystem architecture 102 and a right side electric brake subsystem architecture 103, which are similarly configured. The terms "left" and "right" refer to the port and starboard of the aircraft, respectively. In practice, the two subsystem architectures 102/103 may be independently controlled in the manner described below. For simplicity, only left side electric brake subsystem architecture 102 is described in detail below. It should be appreciated that the following description also applies to right side electric brake subsystem architecture 103.

For this example deployment, left side electric brake subsystem architecture 102 generally includes: a pilot parking brake lever 104; a brake system control unit (BSCU) 106 coupled to pilot parking brake lever 104; a brake pedal 107 coupled to BSCU 106; an outboard electric brake actuator controller (EBAC) 108 coupled to BSCU 106; an inboard EBAC 110 coupled to BSCU 106; an outboard wheel group 112 that includes a fore wheel 114 and an aft wheel 116; an inboard wheel group 118 that includes a fore wheel 120 and an aft wheel 122; electric brake actuators (reference numbers 124, 128, 132, and 136) coupled to the EBACs, and friction brakes (reference numbers 126, 130, 134, and 138) coupled to the EBACs. The electric brake actuators and the friction brakes correspond to each wheel for the left side electric brake subsystem architecture 102. Although not shown in FIG. 1, an embodiment may have more than one electric brake actuator and more than one friction brake per wheel. As explained below, a friction brake is one embodiment of a parking brake mechanism suitable for use in connection with electric brake system 100.

The elements in left side electric brake subsystem architecture 102 can be coupled together using a data communication bus or any suitable interconnection arrangement or architecture that facilitates the handling of signals, data, command/control instructions, or the like. For example, a digital data communication bus or buses may be configured to communicate EBAC control signals from BSCU 106 to the EBACs, to communicate brake mechanism control signals (e.g., actuator control signals) from the EBACs to the electric brake actuators, to communicate friction brake control signals, to communicate sensor data that indicates brake actuator clamping force, etc. Briefly, BSCU 106 reacts to manipulation of pilot parking brake lever 104 and brake pedal 107, and, in response, generates control signals that are received by EBACs 108/110. In turn, EBACs 108/110 generate brake actuator control signals that are received by the electric brake actuators. In turn, the brake actuators engage to impede or prevent rotation of their respective wheels. These features and components are described in more detail below.

Pilot parking brake lever 104 is configured to provide pilot input to electric brake system 100. In one embodiment, the aircraft employs one pilot parking brake lever to control the application of parking brakes for all wheels on the aircraft. In other words, pilot parking brake lever 104 may be shared by both electric brake subsystem architectures on the aircraft. The pilot physically manipulates pilot parking brake lever 104 to electrically initiate engagement of the parking brake of the aircraft. The movement and/or position of pilot parking brake lever 104 may be measured by a hardware servo, switches, or an equivalent component, converted into a parking brake command control signal by a transducer or an equivalent component, and sent to BSCU 106. In the example described herein, manipulation of pilot parking brake lever 104 generates parking brake lever status data that indicates position of pilot parking brake lever 104. In turn, the parking brake lever status data influences the parking brake control logic and the brake status indicator control logic.

Brake pedal 107 is also configured to provide pilot input to electric brake system 100. The pilot physically manipulates brake pedal 107, resulting in deflection or movement (i.e., some form of physical input) of brake pedal 107. This physical deflection is measured from its natural position by a hardware servo or an equivalent component, converted into a BSCU pilot command control signal by a transducer or an equivalent component, and sent to BSCU 106. The BSCU pilot command control signal may convey brake pedal sensor data that may include or indicate the deflection position for brake pedal 107, the deflection rate for brake pedal 107, a desired braking condition for the brake mechanisms, or the like. In the example described herein, manipulation of brake pedal 107 generates brake pedal deflection data that indicates deflection of brake pedal 107. In turn, the brake pedal deflection data influences the parking brake control logic and the brake status indicator control logic.

BSCU 106 is an electronic control unit that has embedded and/or loadable software that digitally computes EBAC control signals that represent braking commands and parking brake commands. The electrical/software implementation allows further optimization and customization of braking performance and parking brake actuation and control as needed for the given aircraft deployment. In practice, each BSCU in electric brake system 100 may be implemented or performed with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. A processor may be realized as a microprocessor, a controller, a microcontroller, or a state machine. A processor may also be implemented as a combination of computing devices, e.g., a combination of a digital signal processor and a microprocessor, a plurality of microprocessors, one or more microprocessors in conjunction with a digital signal processor core, or any other such configuration. In one embodiment, each BSCU is implemented with a computer processor (such as a PowerPC 555) that hosts software and provides external interfaces for the software.

BSCU 106 includes or is otherwise associated with two independent electric brake processing modules. One processing module is the left inboard module, and the other processing module is the left outboard module (these modules may also be referred to as the left inboard channel and the left outboard channel). BSCU 106 monitors various aircraft inputs to provide control functions such as, without limitation: pedal braking; parking braking; automated braking; and gear retract braking. In addition, BSCU 106 blends antiskid commands (which could be generated internally or externally from BSCU 106) to provide enhanced control of braking. BSCU 106 obtains pilot command control signals from brake pedal 107, along with parking brake command control signals from pilot parking brake lever 104. BSCU 106 processes its input signals and generates one or more EBAC control signals that are received by EBACs 108/110. In practice, BSCU 106 transmits the EBAC control signals to EBACs 108/110 via a digital data bus. In a generalized architecture (not shown), each BSCU can generate independent output signals for use with any number of EBACs under its control. As described in more detail below, BSCU 106 is suitably configured to obtain and process data for purposes of controlling a brake status indicator (not shown in FIG. 1). Such data may include, without limitation: brake force data that indicates actual force imparted by the electric brake actuators; parking brake lever status data that indicates position of parking brake lever 104; and parking brake activation data that indicates whether the parking brake mechanisms associated with BSCU 106 are active or inactive. In an embodiment of electric brake system 100, the brake force data and/or the parking brake activation data may originate at EBACs 108/110.

Each EBAC in electric brake system 100 is coupled to and controlled by a BSCU. Each EBAC in electric brake system 100 may be implemented, performed, or realized in the manner described above for the BSCUs. Alternatively, the functionality of BSCU 106 and EBACs 108/110 may be combined into a single processor-based feature or component. In one embodiment, each EBAC is realized with a computer processor (such as a PowerPC 555) that hosts software, provides external interfaces for the software, and includes suitable processing logic that is configured to carry out the various EBAC operations described herein. In this embodiment, each EBAC 108/110 obtains its respective EBAC control signals from BSCU 106, processes the EBAC control signals, and generates the brake mechanism control signals for the aircraft brake assembly.

Each wheel may include an associated brake mechanism and one or more brake actuators. Consequently, braking and parking braking for each wheel may be independently and individually controlled by electric brake system 100. Each electric brake actuator is suitably configured to receive actuator control signals from an EBAC, wherein the actuator control signals influence adjustment of the electric brake actuator. In this embodiment, each electric brake actuator in electric brake system 100 is coupled to and controlled by an EBAC. In this manner, EBACs 108/110 control the brake actuators to apply, release, modulate, and otherwise control the application of the wheel brakes. In this regard, EBACs 108/110 generate the brake mechanism control signals in response to the respective EBAC control signals generated by BSCU 106. The brake mechanism control signals are suitably formatted and arranged for compatibility with the particular brake mechanism utilized by the aircraft. Those skilled in the art are familiar with aircraft brake mechanisms and the general manner in which they are controlled, and such known aspects will not be described in detail here.

The left side electric brake subsystem architecture 102 may include or cooperate with a suitably configured power control subsystem 140. Power control subsystem 140 may be coupled to EBACs 108/110 (and/or to other components of electric brake system 100), and power control subsystem 140 may be configured to apply, remove, and otherwise regulate operating power for the electric brake actuators as needed. For example, power control subsystem 140 can be enabled/disabled to provide the operating power utilized by EBACs 108/110 for purposes of activating the electric brake actuators and/or other components of left side electric brake subsystem architecture 102 after engagement of the friction brakes, which maintain the braking force needed for the parking brake feature.

The right side electric brake subsystem architecture 103 has a structure that is similar to the left side electric brake subsystem architecture 102. For this example deployment, as shown in FIG. 1, the right side electric brake subsystem architecture 103 may include, without limitation: a pilot parking brake lever 104, which may be shared with left side electric brake subsystem architecture 102; a BSCU 146; a brake pedal 147; an inboard EBAC 148; an outboard EBAC 150; an inboard wheel group 152; an outboard wheel group 154; electric brake actuators (reference numbers 164, 168, 172, and 176), and friction brakes (reference numbers 166, 170, 174, and 178) corresponding to their respective wheels (reference numbers 156, 158, 160, and 162). These components are coupled together to operate as described above for left side electric brake subsystem architecture 102, however, the right-side processing is preferably independent of the left-side processing. Also, the right side electric brake subsystem architecture 103 has a dedicated power control subsystem 180. Right BSCU 146 includes or is otherwise associated with two independent electric brake processing modules (thus, electric brake system 100 includes four independently operable electric brake processing modules). One processing module of BSCU 146 is the right inboard module, and the other processing module is the right outboard module (these modules may also be referred to as the right inboard channel and the right outboard channel).

An embodiment of electric brake system 100 distributes wheel brake and parking brake control into four independent channels on two line replaceable units (LRUs). Each of these independent channels/modules receives its own set of inputs (e.g., brake pedal deflection data and parking brake lever status data) and, in turn, independently commands the activation of the parking brake mechanisms for the wheels under its control. For brevity and ease of understanding, such parallel processing will not be described in detail herein. Moreover, each of these independent channels/modules may receive its own set of inputs that are processed in connection with the brake status indicator feature. These inputs may be utilized for other purposes by electric brake system 100 and/or other subsystems on the aircraft. For example, inputs processed by the brake status indicator system may include, without limitation: data that indicates whether the aircraft is airborne or on the ground; brake force data that indicates or represents the actual force imparted by the electric brake actuators; parking brake lever status data that indicates or represents the position of parking brake lever 104; and parking brake activation data that indicates or represents whether parking brake mechanisms (e.g., friction brakes) are active or inactive.

A brake status indicator control scheme and associated processing logic as described herein provides a method of electrically controlling brake status indicator lights in a manner that is similar to that found in traditional hydraulic-mechanical brake systems. In this regard, many legacy hydraulically actuated aircraft brake systems cooperate with a nose gear status light component that includes three lights: a Brake On light; a Parking Brake Set light; and a Brake Off light. Notably, such legacy systems use the Brake On light and the Parking Brake Set light to indicate that brake force is applied in a parked condition. This requirement is due to the manner in which such legacy systems monitor the various brake system conditions—for example, the brake system may provide no hydraulic clamping force even though the parking brake lever is engaged. In contrast, an electric brake system as described herein may instead process sensor data that indicates the actual brake clamping force at the brake actuators and/or feedback or confirmation data that indicates that the parking brake is actually set. Moreover, the brake status indicator control logic is suitably configured such that the electric brake system manipulates the brake status indicator in a manner that mimics brake status indication characteristics of a legacy hydraulically actuated brake system. For example, the same pattern of indicator lights is preserved for the various operating states, which eliminates the need for re-learning of a new indication scheme by members of the ground crew.

Figure 2:
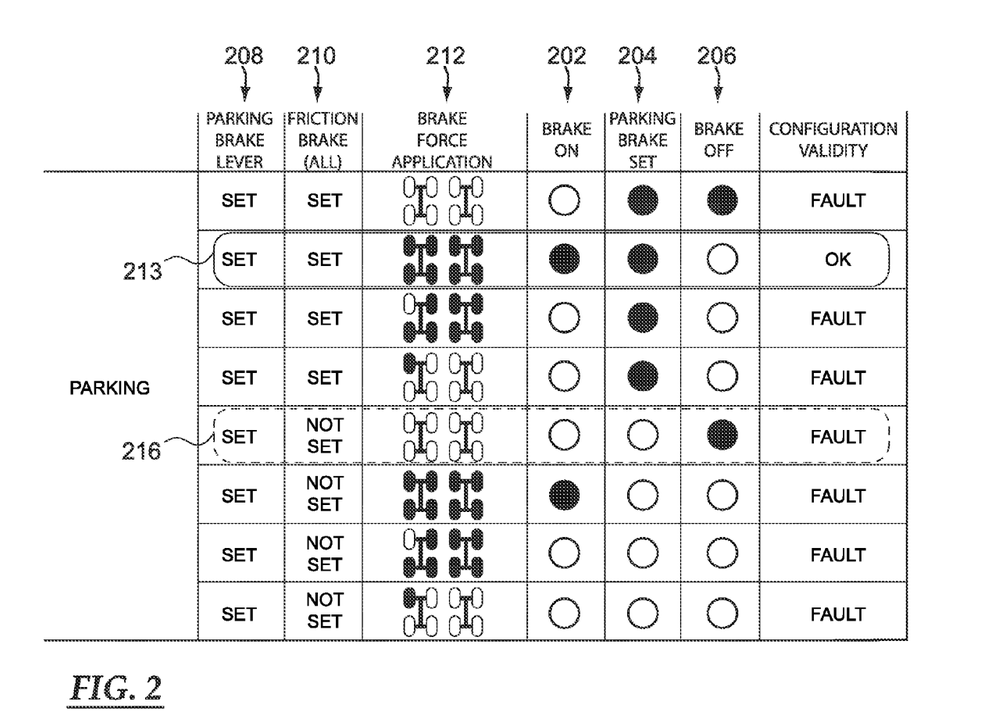
FIG. 2 is a diagram that illustrates logical states of an embodiment of a brake status indicator under a parking condition.
Figure 3:
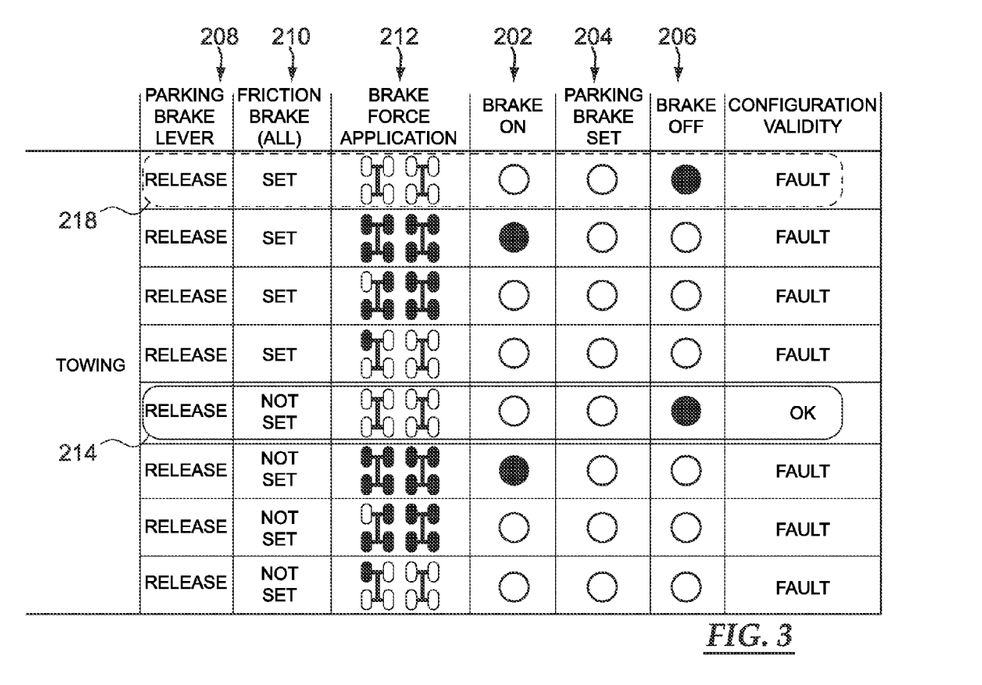
FIG. 3 is a diagram that illustrates logical states of an embodiment of a brake status indicator under a towing condition.

FIG. 2 is a diagram that illustrates logical states of an embodiment of a brake status indicator under a parking condition, and FIG. 3 is a diagram that illustrates logical states of an embodiment of a brake status indicator under a towing condition. These diagrams depict the various active (shaded) and inactive (unshaded) states of a Brake On element 202, a Parking Brake Set element 204, and a Brake Off element 206 for different operating conditions. For this example, the parking brake lever status 208 may either be Set (i.e., the parking brake lever is fully raised) or Released (i.e., the parking brake lever is down), and the parking brake activation status 210 for the friction brake may either be Set (i.e., the friction brake results in clamping force and prevents rotation of the respective wheel) or Not Set (i.e., the friction brake is released and does not impede rotation of the respective wheel). Also for this example, the brake force status 212 for a given brake or wheel may either be Actuated or On (i.e., the electric brake actuator or actuators for the wheel impart clamping force and prevent rotation of the wheel) or Non-Actuated or Off (i.e., the electric brake actuator or actuators for the wheel are released and do not impede rotation of the wheel). FIG. 2 and FIG. 3 schematically depict an Actuated status with shading for the respective wheel, and a Non-Actuated status with no shading for the respective wheel. For example, the first row in FIG. 2 represents a condition where all of the brakes are Non-Actuated, the second row in FIG. 2 represents a condition where all of the brakes are Actuated, and the third row in FIG. 2 represents a condition where all but one of the brakes are Actuated.

The second row in FIG. 2 corresponds to a condition 213 where Brake On element 202 is activated, Parking Brake Set element 204 is activated, and Brake Off element 206 is deactivated. When the ground crew sees this particular pattern of activated indictor elements, it assumes that the aircraft is in a parking brake mode. In this embodiment, condition 213 occurs only if the parking brake lever status 208 is Set, if the parking brake activation status 210 is Set for all of the friction brakes in the electric brake system, and if the brake force status 212 is Actuated for all of the brake actuators in the electric brake system. In this regard, the pattern of lights depicted for condition 213 is not found anywhere else in either diagram.

The fifth row in FIG. 3 corresponds to a condition 214 where Brake On element 202 is deactivated, Parking Brake Set element 204 is deactivated, and Brake Off element 206 is activated. In this embodiment, condition 214 occurs if the parking brake lever status 208 is Released, if the parking brake activation status 210 is Not Set for all of the friction brakes in the electric brake system, and if the brake force status 212 is Not Actuated for all of the brake actuators in the electric brake system. Thus, when the ground crew sees this particular pattern of activated indicator elements, it assumes that the aircraft is in a towing mode. Notably, the fifth row in FIG. 2 and the first row in FIG. 3 also correspond to respective conditions 216/218 where Brake On element 202 is deactivated, Parking Brake Set element 204 is deactivated, and Brake Off element 206 is activated. These conditions 216/218 represent possible fault conditions that will not normally occur under normal operating conditions. Nonetheless, these conditions 216/218 still accurately reflect the actual brake actuation state of the aircraft, namely, that all of the electric brake actuators are in a Non-Actuated state, thus allowing rotation of all of the wheels. Thus, these conditions 216/218 may still allow towing of the aircraft.

The other rows in FIG. 2 and FIG. 3 represent possible fault conditions that will not normally occur under normal operating conditions. Thus, if a member of the ground crew sees a light pattern that corresponds to one of these fault conditions, corrective action can be taken.

FIG. 4 is a schematic representation of an embodiment of a brake status indicator system 300, including related processing modules of an electric brake system. In this regard, system 300 may be implemented in electric brake system 100. Therefore, system 300 may share certain components, features, and functionality with system 100; such common components, features, and functionality will not be redundantly described here.

Brake status indicator system 300 generally includes, without limitation: a brake status indicator 302; and a plurality of electric brake processing modules or channels (reference numbers 304, 306, 308, and 310) coupled to brake status indicator 302. For this example, system 300 employs a left inboard module/channel 304, a left outboard module/channel 306, a right inboard module/channel 308, and a right outboard module/channel 310. Each of these modules/channels is preferably configured to independently process electric brake system data to determine parking brake status and brake force status in the manner described in more detail herein. Left inboard module/channel 304 and left outboard module/channel 306 may be implemented in a left BSCU 311 of the electric brake system, while right inboard module/channel 308 and right outboard module/channel 310 may be implemented in a right BSCU 312 of the electric brake system.

Brake status indicator 302 may include a Brake On element 314, a Parking Brake Set element 316, and a Brake Off element 318. Each of these elements may be realized using a lamp, an LED, a light, or any electrically actuated device. Brake status indicator 302 is suitably configured to receive control signals generated in response to the current parking brake status and the current brake force status of the electric brake system (for each processing module/channel). In this embodiment, each of the elements 314/316/318 is independently controlled by the processing modules/channels. For example, the processing modules/channels can cooperate to generate a first control signal for Brake On element 314, a second control signal for Parking Brake Set element 316, and a third control signal for Brake Off element 318. A given control signal may function as an activation signal or a deactivation signal for its respective brake status indicator element, where an activation signal causes the element to activate (e.g., illuminate) and a deactivation signal causes the element to deactivate (e.g., not illuminate). In practice, a given control signal may be realized as a logic high or low signal, a power-on voltage, a binary word, an electric current or pulse, or any suitably configured and formatted means for electronically conveying the desired control instruction.

As described above with reference to FIG. 2 and FIG. 3, each of the electric brake processing modules/channels 304/306/308/310 may be suitably configured to independently obtain brake force data, parking brake lever status data, and parking brake activation data. In addition, one or more of the processing modules/channels may be configured to obtain air/ground data that indicates whether the aircraft is airborne or on the ground. Referring to condition 213 (see FIG. 2), the processing modules/channels for this embodiment cooperate to generate an activation signal for Brake On element 314, an activation signal for Parking Brake Set element 316, and a deactivation signal for Brake Off element 318 if: the parking brake lever status data indicates a Set status; the parking brake activation data indicates an Active status for all of the parking brake mechanisms; and the brake force data indicates an Actuated status for all of the electric brake actuators. Referring to condition 214 (see FIG. 3), the processing modules/channels for this embodiment cooperate to generate a deactivation signal for Brake On element 314, a deactivation signal for Parking Brake Set element 316, and an activation signal for Brake Off element 318 if: the parking brake lever status data indicates a Released status; the parking brake activation data indicates an Inactive status for all of the parking brake mechanisms; and the brake force data indicates a Non-Actuated status for all of the electric brake actuators.

Brake status indicator system 300 may employ any suitably configured processing logic, electronic circuitry, software, and/or firmware that results in the brake status indicator characteristics depicted in FIG. 2 and FIG. 3. FIG. 4 depicts one example architecture that is primarily realized in BSCUs 311/312. This embodiment employs switching architectures (reference numbers 320, 322, 324, and 326) coupled to brake status indicator 302; these switching architectures are configured to generate the various control signals for Brake On element 314, Parking Brake Set element 316, and Brake Off element 318 in response to the input data processed by system 300.

Switching architecture 320 is suitably configured to establish a power-on circuit for Brake On element 314 only if the brake force data indicates an Actuated status for all of the electric brake actuators in the electric brake system. In this embodiment, switching architecture 320 includes four independently controlled switches arranged in series—one switch per processing module/channel. A given switch in switching architecture 320 is closed when the brake force data indicates that the brake force (as detected by the respective processing module/channel) is greater than or equal to a designated high threshold value. Brake status indicator system 300 illustrated in FIG. 4 employs a high threshold value that corresponds to 25% of the full braking performance. When all of the switches in switching architecture 320 are closed, one input of Brake On element 314 becomes grounded (see switch 320*a*).

Switching architecture 322 is suitably configured to establish a power-on circuit for Parking Brake Set element 316 only if the parking brake lever status data indicates a Set status, and if the parking brake activation data indicates an Active status for all of the parking brake mechanisms (e.g., the friction brakes) in the electric brake system. In this embodiment, switching architecture 322 includes four independently controlled switches arranged in series—one switch per processing module/channel. A given switch in switching architecture 322 is closed when both (1) the friction brakes controlled by the respective processing module/channel are set and (2) the parking brake lever is fully raised. When all of the switches in switching architecture 322 are closed, one input of Parking Brake Set element 316 becomes grounded (see switch 322*a*).

Switching architecture 324 is suitably configured to establish a power-on circuit for Brake Off element 318 only if the brake force data indicates a Non-Actuated status for all of the electric brake actuators in the electric brake system. In this embodiment, switching architecture 324 includes four independently controlled switches arranged in series—one switch per processing module/channel. A given switch in switching architecture 324 is closed when the brake force data indicates that the brake force (as detected by the respective processing module/channel) is less than or equal to a designated low threshold value. Brake status indicator system 300 illustrated in FIG. 4 employs a low threshold value that corresponds to 2% of the full braking performance. When all of the switches in switching architecture 324 are closed, one input of Brake Off element 318 becomes grounded (see switch 324a).

Switching architecture 326 is suitably configured to provide a supply voltage to brake status indicator 302 when the aircraft is on the ground. Moreover, switching architecture 326 is suitably configured to remove the supply voltage from brake status indicator 302 when the aircraft is airborne. In this embodiment, switching architecture 326 includes two independently controlled switches—one switch 326c resides in processing module/channel 308 and one switch 326d resides in processing module/channel 310. A given switch in switching architecture 326 is closed when the aircraft is on the ground and open when the aircraft is airborne. For this example, a 28 volt supply voltage is provided to the status indicator elements 314/316/318 when either switch 326c/326d is closed. Otherwise, the 28 volt supply voltage is removed from brake status indicator 302, thus preventing actuation of any individual status indicator element 314/316/318. In other words, when either switch 326c/326d is closed, the 28 volt supply voltage is coupled to the second input of each status indicator element 314/316/318. Thus, the 28 volt supply voltage, combined with the grounding of the first input of a status indicator element 314/316/318, establishes a power-on or activation circuit for the given status indicator element 314/316/318.

Figure 5:
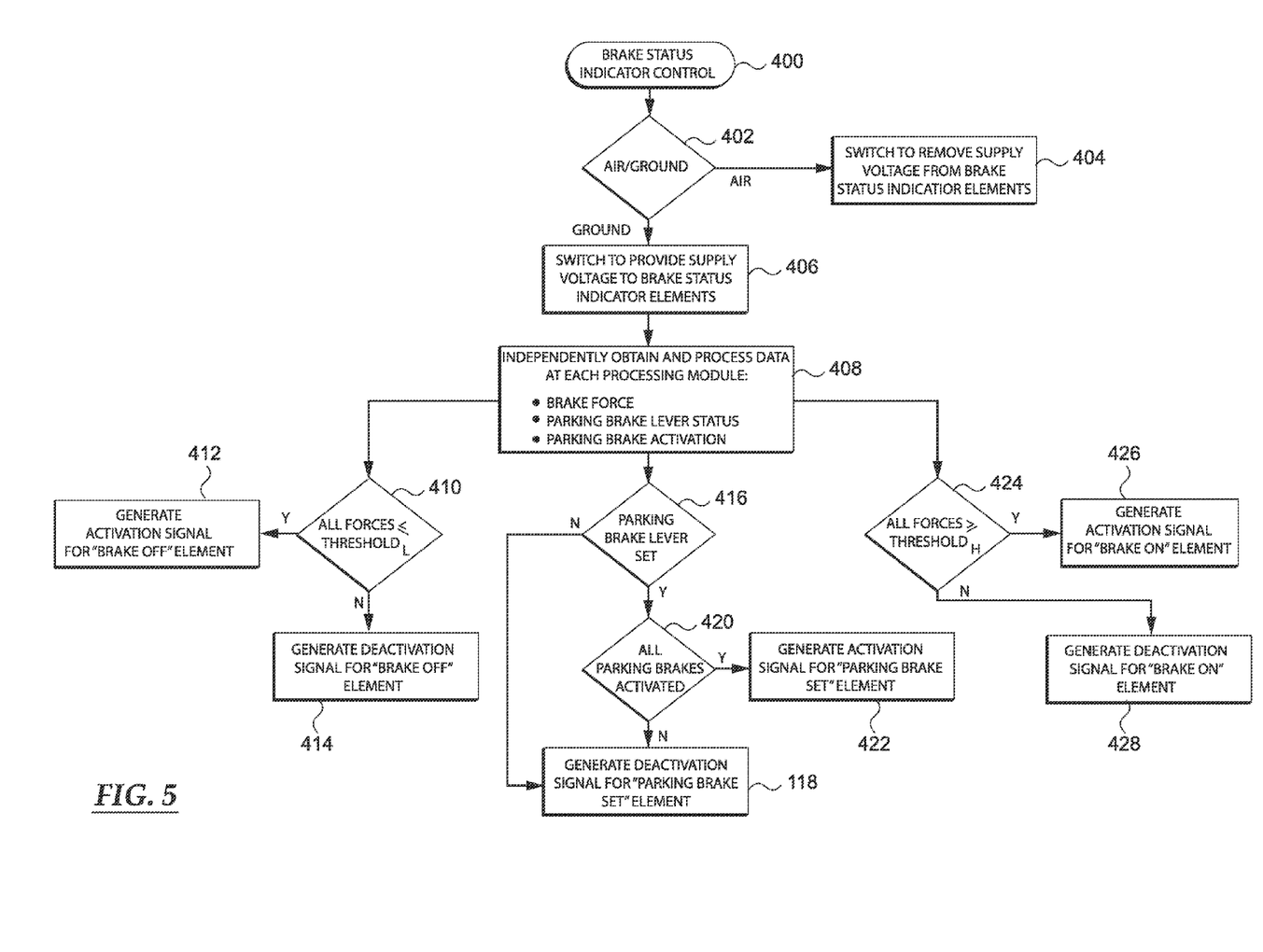
FIG. 5 is a flow chart that illustrates an embodiment of a brake status indicator control process.

FIG. 5 is a flow chart that illustrates an embodiment of a brake status indicator control process 400. The various tasks performed in connection with process 400 may be performed by software, hardware, firmware, or any combination thereof. For illustrative purposes, the following description of process 400 may refer to elements mentioned above in connection with FIGS. 1-4. In embodiments of the invention, portions of process 400 may be performed by different elements of the described system, e.g., a BSCU, a processing module/channel implemented in a BSCU, or the like. It should be appreciated that process 400 may include any number of additional or alternative tasks, the tasks shown in FIG. 5 need not be performed in the illustrated order, and process 400 may be incorporated into a more comprehensive procedure or process having additional functionality not described in detail herein.

As an initial task, brake status indicator control process 400 may check whether the aircraft is airborne or on the ground (query task 402). If airborne, then process 400 may switch a supply voltage to remove the voltage from the brake status indicator elements (task 404). As discussed above with reference to FIG. 4, task 404 effectively disables the brake status indicator while the aircraft is in flight. If the aircraft is on the ground, then process 400 may switch the supply voltage to provide the voltage to the brake status indicator elements (task 406). As explained above, the power-on circuit for a given brake status indicator element must be established to activate (e.g., illuminate) that indicator element.

Brake status indicator control process 400 preferably monitors, obtains, and processes data at each processing module/channel in an independent manner (task 408). For this embodiment, this data includes, without limitation: brake force data; parking brake lever status data; and parking brake activation data. Each processing module/channel processes its data, and the processing modules/channels operate in a concurrent manner to control the activation/deactivation state of each brake status indicator element. FIG. 5 depicts task 408 leading to three branches—these branches represent parallel processing paths performed by each processing module/channel.

Referring to query task 410, if the brake force data processed by all of the processing modules/channels indicates a Non-Actuated status for all of the electric brake actuators (e.g., the measured brake forces are all less than or equal to a low threshold), then brake status indicator control process 400 generates an activation control signal for the Brake Off element (task 412). Otherwise, process 400 generates a deactivation control signal for the Brake Off element (task 414).

Concurrently, if the parking brake lever status data indicates a Set status (query task 416), and if the parking brake activation data indicates an Active status for all of the parking brake mechanisms (query task 420), then brake status indicator control process 400 generates an activation control signal for the Parking Brake Set element (task 422). Otherwise, process 400 generates a deactivation control signal for the Parking Brake Set element (task 418). In other words, the Parking Brake Set element will be deactivated if either (1) the parking brake lever status data indicates a Released status, or (2) the parking brake activation data indicates an Inactive status for any of the parking brake mechanisms.

Referring to query task 424, if the brake force data processed by all of the processing modules/channels indicates an Actuated status for all of the electric brake actuators (e.g., the measured brake forces are all greater than or equal to a high threshold), then brake status indicator control process 400 generates an activation control signal for the Brake On element (task 426). Otherwise, process 400 generates a deactivation control signal for the Brake On element (task 428).

Referring again to FIG. 4, from a BSCU perspective, the Brake On element will be activated only if both BSCUs 311/312 independently determine that all of their respectively controlled electric brake actuators are actuated. Similarly, the Parking Brake Set element will be activated only if both BSCUs 311/312 independently determine that the parking brake lever is raised and that all of their respectively controlled friction brakes are activated. Likewise, the Brake Off element will be activated only if both BSCUs 311/312 independently determine that all of their respectively controlled electric brake actuators are released.

For this embodiment, the generation of the different activation and deactivation control signals by brake status indicator control process 400 results in the brake status indicator patterns depicted in FIG. 2 and FIG. 3 for the various input data conditions. In practice, an embodiment of process 400 can be modified to accommodate any desired indication pattern, any number of brake status indicator elements, and alternative or additional input data types.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention, where the scope of the invention is defined by the claims, which includes known equivalents and foreseeable equivalents at the time of filing this patent application.

What is claimed is:

1. A method of controlling a brake status indicator for a vehicle having a plurality of independently controlled electric brake processing channels configured to control a plurality of electric brake actuators and a plurality of parking brake mechanisms, the method comprising:
obtaining brake force data for each of the plurality of processing channels, the brake force data indicating actual force imparted by the plurality of electric brake actuators;
obtaining parking brake lever status data for each of the plurality of processing channels, the parking brake lever status data indicating position of a parking brake lever of the vehicle;
obtaining parking brake activation data for each of the plurality of processing channels, the parking brake activation data indicating whether the parking brake mechanisms are active or inactive; and
generating, in response to the brake force data, the parking brake lever status data, and the parking brake activation data, at least one control signal for the brake status indicator.

2. A method according to claim 1, wherein generating at least one control signal manipulates the brake status indicator in a manner that mimics brake status indication characteristics of a legacy hydraulically actuated vehicle brake system.

3. A method according to claim 1, wherein:
the brake status indicator comprises a Brake On element, a Parking Brake Set element, and a Brake Off element; and
generating at least one control signal comprises generating a first control signal for the Brake On element, a second control signal for the Parking Brake Set element, and a third control signal for the Brake Off element.

4. A method according to claim 3, wherein generating at least one control signal comprises generating an activation signal for the first control signal, an activation signal for the second control signal, and a deactivation signal for the third control signal if:
the parking brake lever status data indicates a Set status;
the parking brake activation data indicates an Active status for all of the parking brake mechanisms; and
the brake force data indicates an Actuated status for all of the electric brake actuators.

5. A method according to claim 3, wherein generating at least one control signal comprises generating a deactivation signal for the first control signal, a deactivation signal for the second control signal, and an activation signal for the third control signal if:
the parking brake lever status data indicates a Released status;
the parking brake activation data indicates an Inactive status for all of the parking brake mechanisms; and
the brake force data indicates a Non-Actuated status for all of the electric brake actuators.

6. A method according to claim 3, wherein generating at least one control signal comprises generating a deactivation signal for the first control signal, a deactivation signal for the second control signal, and an activation signal for the third control signal if:
the parking brake lever status data indicates a Set status;
the parking brake activation data indicates an Inactive status for all of the parking brake mechanisms; and
the brake force data indicates a Non-Actuated status for all of the electric brake actuators.

7. A method according to claim 3, wherein generating at least one control signal comprises generating a deactivation signal for the first control signal, a deactivation signal for the second control signal, and an activation signal for the third control signal if:
the parking brake lever status data indicates a Released status;
the parking brake activation data indicates an Active status for all of the parking brake mechanisms; and
the brake force data indicates a Non-Actuated status for all of the electric brake actuators.

8. A brake status indicator system for a vehicle having an electric brake system, the brake status indicator system comprising:
a brake status indicator having a Brake On element, a Parking Brake Set element, and a Brake Off element; and
a plurality of electric brake processing modules coupled to the brake status indicator, each of the electric brake processing modules being configured to independently process electric brake system data to determine parking brake status and brake force status; wherein
the brake status indicator receives control signals generated in response to the parking brake status and the brake force status for each of the electric brake processing modules.

9. A brake status indicator system according to claim 8, wherein the plurality of electric brake processing modules include a left inboard module and a left outboard module implemented in a left brake system control unit (BSCU) of the electric brake system, and a right inboard module and a right outboard module implemented in a right BSCU of the electric brake system.

10. A brake status indicator system according to claim 8, wherein each of the plurality of electric brake processing modules is configured to independently obtain:
brake force data that indicates actual force imparted by electric brake actuators controlled by the electric brake processing module;
parking brake lever status data that indicates position of a parking brake lever of the vehicle; and
parking brake activation data that indicates whether parking brake mechanisms controlled by the electric brake processing module are active or inactive.

11. A brake status indicator system according to claim 10, further comprising a switching architecture coupled to the brake status indicator, the switching architecture being configured to establish a power-on circuit for the Brake On element only if the brake force data indicates an Actuated status for all of the electric brake actuators.

12. A brake status indicator system according to claim 10, further comprising a switching architecture coupled to the brake status indicator, the switching architecture being configured to establish a power-on circuit for the Parking Brake Set element only if:
the parking brake lever status data indicates a Set status; and
the parking brake activation data indicates an Active status for all of the parking brake mechanisms.

13. A brake status indicator system according to claim 10, further comprising a switching architecture coupled to the brake status indicator, the switching architecture being configured to establish a power-on circuit for the Brake Off element only if the brake force data indicates a Non-Actuated status for all of the electric brake actuators.

14. A brake status indicator system according to claim 8, wherein the plurality of electric brake processing modules cooperate to generate a first control signal for the Brake On element, a second control signal for the Parking Brake Set element, and a third control signal for the Brake Off element.

15. A brake status indicator system according to claim 14, wherein the plurality of electric brake processing modules cooperate to generate an activation signal for the first control signal, an activation signal for the second control signal, and a deactivation signal for the third control signal if:

the parking brake lever status data indicates a Set status;

the parking brake activation data indicates an Active status for all of the parking brake mechanisms; and the brake force data indicates an Actuated status for all of the electric brake actuators.

16. A brake status indicator system according to claim 14, wherein the plurality of electric brake processing modules cooperate to generate a deactivation signal for the first control signal, a deactivation signal for the second control signal, and an activation signal for the third control signal if:

the parking brake lever status data indicates a Released status;

the parking brake activation data indicates an Inactive status for all of the parking brake mechanisms; and the brake force data indicates a Non-Actuated status for all of the electric brake actuators.

17. A brake status indicator system according to claim 8, further comprising a switching architecture coupled to the brake status indicator, the switching architecture being configured to provide a supply voltage to the brake status indicator when the vehicle is on the ground, and to remove the supply voltage from the brake status indicator when the vehicle is airborne.

18. A method of controlling a brake status indicator for a vehicle having a first brake system control unit (BSCU) and a second BSCU, the first and second BSCUs being configured to independently control respective electric brake actuators and respective parking brake mechanisms, the method comprising:

activating a Brake On element of the brake status indicator only if: (1) the first BSCU determines that all of the electric brake actuators associated with the first BSCU are actuated, and (2) the second BSCU determines that all of the electric brake actuators associated with the second BSCU are actuated;

activating a Parking Brake Set element of the brake status indicator only if: (1) the first BSCU determines that all of the parking brake mechanisms associated with the first BSCU are activated, and (2) the second BSCU determines that all of the parking brake mechanisms associated with the second BSCU are activated; and activating a Brake Off element of the brake status indicator only if: (1) the first BSCU determines that all of the electric brake actuators associated with the first BSCU are released, and (2) the second BSCU determines that all of the electric brake actuators associated with the second BSCU are released.

19. A method according to claim 18, wherein activating the Parking Brake Set element only occurs if: (1) the first BSCU determines that a parking brake lever of the vehicle is set, and (2) the second BSCU independently determines that the parking brake lever of the vehicle is set.

20. A method according to claim 18, further comprising switching a supply voltage of the brake status indicator in response to an airborne/on-the-ground status of the vehicle.

* * * * *